United States Patent [19]

Bonfatti et al.

[11] 4,219,085
[45] Aug. 26, 1980

[54] MULTIROW SUGAR-BEET HARVESTER

[76] Inventors: Remo Bonfatti; Lorenzo Bonfatti, both of Via Ferrarese 454, Stellata di Bondero, Italy

[21] Appl. No.: 930,525

[22] Filed: Aug. 3, 1978

[30] Foreign Application Priority Data

Aug. 5, 1977 [IT] Italy .................................. 3527 A/77
Feb. 7, 1978 [IT] Italy .............................. 46813 A/78

[51] Int. Cl.² ......................................... A01D 27/04
[52] U.S. Cl. ..................................... 171/101; 171/10
[58] Field of Search ................... 171/1, 12, 14, 50–62, 171/101, 10

[56] References Cited

U.S. PATENT DOCUMENTS

| 2,537,118 | 1/1951 | Andersen et al. | 171/103 X |
| 3,191,686 | 6/1965 | Everett et al. | 171/58 |
| 3,294,177 | 12/1966 | Schaal et al. | 171/42 |
| 4,024,920 | 5/1977 | Haverdink | 171/58 |

FOREIGN PATENT DOCUMENTS

| 709573 | 1/1968 | Belgium | 171/10 |
| 743060 | 12/1969 | Belgium | 171/10 |
| 845605 | 10/1976 | Belgium | 171/10 |
| 1112850 | 2/1962 | Fed. Rep. of Germany | 171/10 |
| 1963833 | 7/1970 | Fed. Rep. of Germany | 171/10 |
| 2040952 | 1/1971 | France | 171/101 |
| 2102383 | 3/1972 | France | 171/101 |
| 7506772 | 6/1975 | Netherlands | 171/10 |
| 1248850 | 10/1971 | United Kingdom | 171/10 |

Primary Examiner—Russell R. Kinsey
Attorney, Agent, or Firm—Karl F. Ross

[57] ABSTRACT

A multirow sugar-beet harvester has a chassis displaceable along the ground above several rows of sugar beets and is provided with a plurality of pairs of extractor plows which dig up the sugar beets in several rows simultaneously. A grillwork wheel is provided tangent to one of the plows of each pair and is rotated to pick up sugar beets from the plows and displace them backwardly into the transversely extending and elongated inlet mouth of the horizontal stretch of a conveyor. A vertical stretch of this conveyor then transports the sugar beets upwardly and drops them into a bin on the chassis.

8 Claims, 2 Drawing Figures

MULTIROW SUGAR-BEET HARVESTER

FIELD OF THE INVENTION

The present invention relates to a machine for harvesting sugar beets and is more particularly directed to a machine of this type set up to harvest several rows of sugar beets simultaneously.

BACKGROUND OF THE INVENTION

The machines known up to today for harvesting sugar beets are generally set up for harvesting a single row of beets at a time, that is the machines can only harvest a single row although efforts have been made to be able to harvest at least two rows of sugar beets.

Thus for example one of these known machines for harvesting a single row has a structure comprising essentially a pair of sugar-beet extracting plows, a crop conveyor for lifting and loading the extracted sugar beets, this conveyor being constituted by endless chains passing over reversing sprockets of horizontal axis perpendicular to the direction of travel of the machine, this conveyor being provided laterally with respect to the pair of extractor plows, with a grillwork wheel provided with its axis inclined in a vertical plane passing through the axis of the return sprockets of the crop transporter for lifting and loading between the above-cited pair of extractor plows and the crop conveyor for lifting and loading, and that in this manner the lower part of the peripheral edge of this wheel is practically tangent and coplaner with one of the extracting plows of the pair of extracting plows whereas the upper edge of the peripheral rim of this grillwork wheel is aligned with the central open part of one of the return sprockets that is part of the crop conveyor for lifting and loading, a grillwork guide extending as a slide peripherally around the lower part of the edge of the grillwork wheel with respect to the direction of travel of the machine starting from the other extracting plow of the pair of extractor plows and this just up to the peripheral part of the return sprocket of the crop conveyor for lifting and loading. It was attempted to provide such a machine with a second pair of extracting plows at the front edge of the peripheral edge with respect to the direction of travel of the machine of the above-cited grillwork wheel, but this has not worked out in practice with respect to the possibility of the functioning of the machine as well with the harvesting of sugar beets by this second pair of extracting sockets and the loading of these sugar beets onto the grillwork wheel as a result of the position that the extractor plows of the second pair of extractor plows must take with respect to the ground and to the grillwork wheel itself as regards the quantity of sugar beets which are underneath a single grillwork wheel as a result of the limited space across the above-cited return sprocket for the unloading of the sugar beets themselves onto the crop conveyor for lifting and loading which for a normal speed of travel of the sugar-beet harvesting machine results in blockages and thereby results in damage to the sugar beets themselves and frequent breakdowns of the machine.

OBJECTS OF THE INVENTION

The main object of the present invention is to provide a sugar-beet harvesting machine for several rows, by providing a plurality of grillwork wheels arranged next to each other and each having a respective pair of extracting plows, and a crop conveyor for lifting and loading the extracted sugar beets having a wide input mouth for the extracted sugar beets, this conveyor extending parallel in back of the plurality of grillwork wheels situated next to each other.

Another object of this invention is to provide a machine for harvesting sugar beets in several rows in accordance with the main object and having a practical and functional structure which is particularly simple and economic relative to the output of the machine.

SUMMARY OF THE INVENTION

All these objects as well as others are attained by the machine according to the invention for harvesting sugar beets, this machine having one or two pairs of sugar-beet extracting plows, a crop conveyor for lifting and loading the extracted sugar beets, a grillwork wheel arranged with its axis inclined to the vertical between that or those pairs of extracting plows and the crop conveyor for lifting and loading the extracted sugar beets, this wheel being practically tangent and coplanar with one of the extracting plows of the pair or pairs of extractor plows, and a grillwork guide extending peripherally as a slide around the rear part of the peripheral edge relative to this direction of travel of the machine of this grillwork wheel starting from the other extractor plow of the pair or pairs of extractor plows up to the above-cited crop conveyor for lifting and loading the extracted sugar beets, this machine being characterized in that it has a plurality of grillwork wheels of axes inclined with respect to the vertical provided aligned next to each other parallel to each other in a direction perpendicular to the direction of travel of the machine, and a crop conveyor for lifting the sugar beets having a wide input mouth for extracted sugar beets extending parallel behind the plurality of grillwork wheels of axes inclined with respective vertical and aligned next to each other, and wherein each of these grillwork wheels of axis inclined relative to the vertical and aligned next to each other is associated with one of the above-cited pairs of sugar-beet extractor plows and a respective guide corresponding to the grillwork structure and extending peripherally as a slide around the rear part of the peripheral edge relative to the direction of travel of the machine of this same grillwork wheel of axis inclined to the vertical and extending starting from the other extractor plow of the corresponding pair of extractor plows up to the above-cited inlet mouth for extracted sugar beets of the crop conveyor for lifting and loading the extracted sugar beets, means being provided for operating the plurality of grillwork wheels of axes inclined with respect to the vertical and aligned next to each other so that their direction of rotation is toward the inlet mouth.

BRIEF DESCRIPTION OF THE DRAWING

Other characteristics and advantages will be seen from the detailed description which follows of a preferred but not limiting embodiment of the machine according to this invention, illustrated purely by way of example with reference to the attached drawing in which.

SPECIFIC DESCRIPTION

Figure 1:
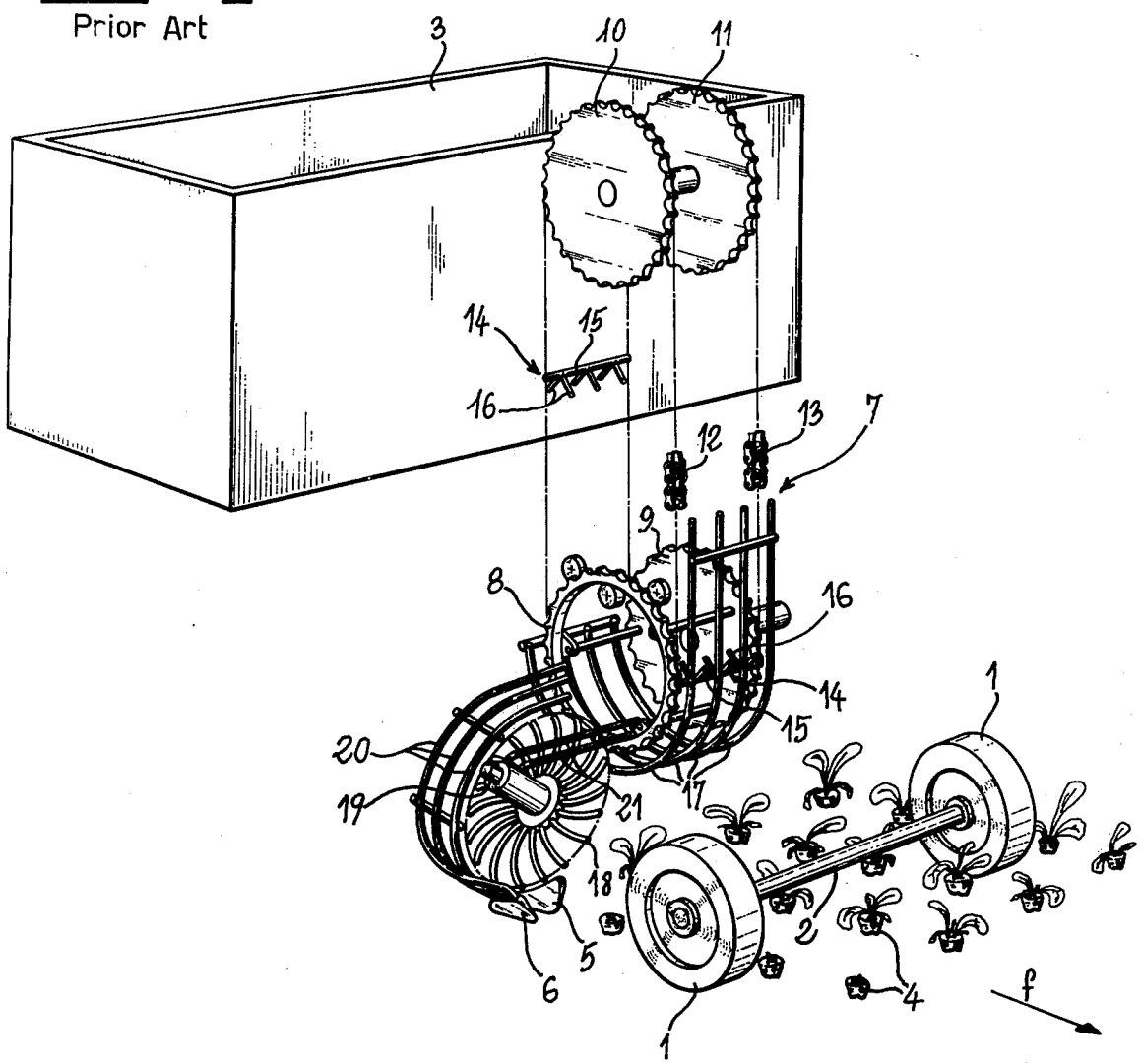
FIG. 1 is a schematic perspective view of a standard harvesting machine for one row based on the prior-art techniques relative to the technological development of these machines for harvesting sugar beets.

FIG. 1 schematically shows a standard harvesting machine for one row, this figure illustrating the principle of operation of this machine. The machine comprises a pair of front wheels 1 carried on a horizontal axle 2, and a rear bin 3 intended to collect the extracted sugar beets 4 as will be better seen below along a row of sugar beets. Between the pair of front wheels 1 and the bin 3 receiving the crop the not-illustrated chassis of the machine carries a pair of extractor plows 5 and 6 and a crop conveyor for lifting and loading the extracted sugar beets 4 into the receiving bin 3, this conveyor being indicated generally at 7. The crop conveyor 7 for lifting and loading is constituted essentially by two pairs of sprockets 8, 9 and 10, 11 whose axles are arranged horizontally and perpendicular to the direction of travel of the machine (indicated by arrow f), these axles being superimposed above each other, and by two endless chains 12 and 13 respectively passing over the sprockets 8, 10 and 9, 11. These chains 12 and 13 carry a plurality of equidistant entrainment arms 14 each constituted by a bar 15 connected to the chains and provided with a plurality of lateral projections or projecting pins 16 directed inwardly of the annulus form by each chain. Grillwork guides (guide means) 17 are provided adjacent the outer periphery of the crop conveyor 7 assist in the lifting and loading along the entire transport path of the sugar beets 4 up to the receiving bin 3. Between the pair of extractor plows 5 and 6 and the sprocket wheel 8 of the crop conveyor 7 for lifting and loading, which wheel is open centrally, there is a grillwork wheel 18 whose axle 19 is inclined with respect to the vertical so that the lower part of the peripheral edge of this wheel is practically tangent to and coplanar with the extractor plow 5 and the upper part of the periphery of this wheel is in line with the central opening in the sprocket wheel 8. A grillwork guide 20 extends peripherally as a slide around the lower and rear part of the periphery with respect to the direction of travel of the machine (arrow f) of the grillwork wheel 18, starting from the extractor plow 6 up to the lower part of the sprocket wheel 8 of the crop conveyor 7 for lifting and loading. A grillwork guide 21 is provided above the grillwork wheel 18 downstream of the grillwork guide 20 mentioned above forming a slide so as to ensure the deflection of the extracted sugar beets toward and into the conveyor 7, through the central open part of the sprocket wheel 8 of this conveyor 7 for lifting loading the crop. The sugar beets 4 extracted by the extracting plows 5 and 6 along a row of sugar beets are lifted on these extracting plows 5 and 6 themselves until they are led onto the grillwork wheel 18 which with the aid of the grillwork guide 20 lifts them for finally loading them with the aid of a fixed grillwork guide 21 into the bottom of the crop conveyor 7 for lifting and loading, through the central open part of the sprocket wheel 8 of this conveyor which therefore lifts the sugar beets and loads them into the receiving bin 3 by means of the entrainment arms 14.

Figure 2:
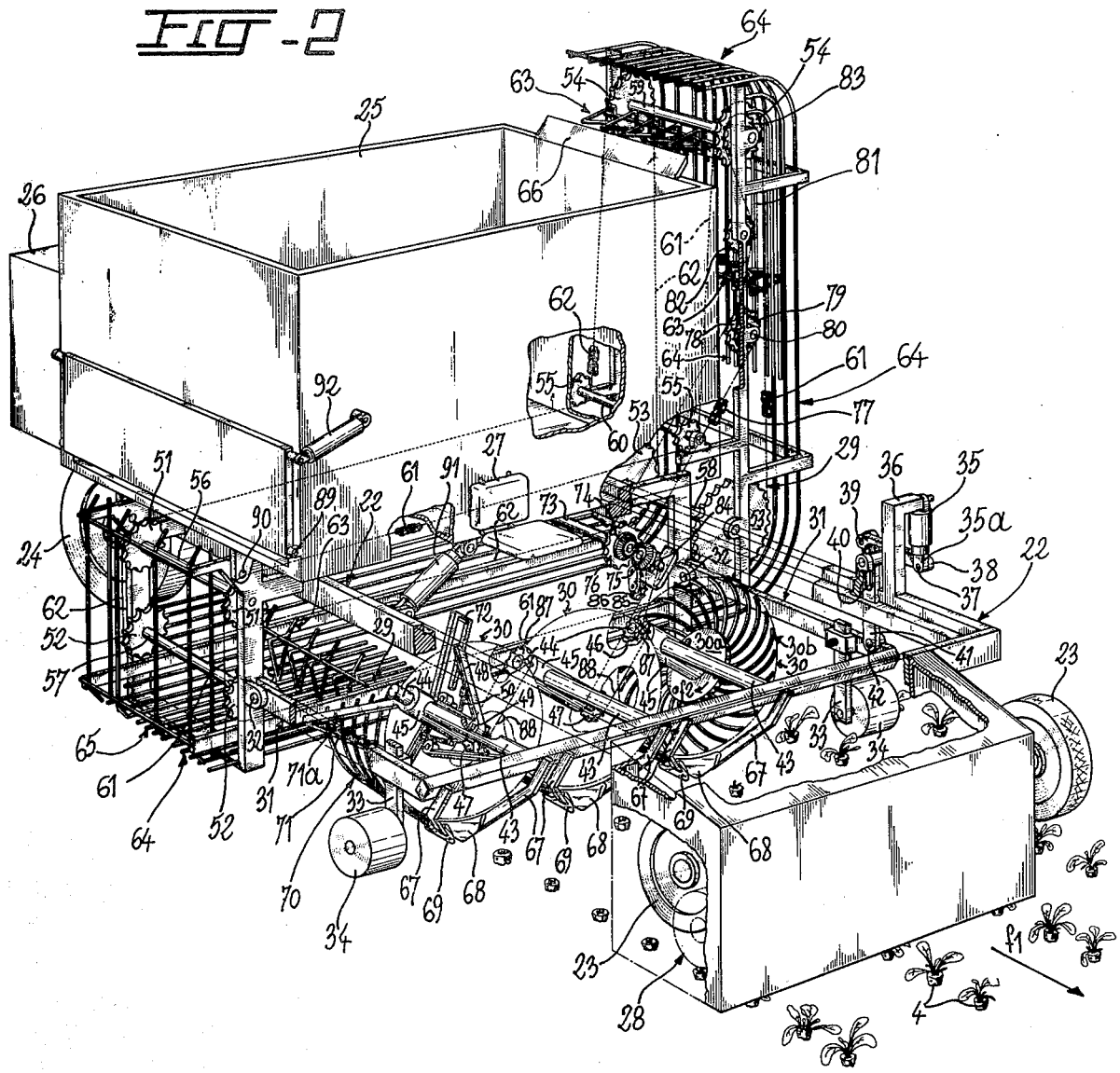
FIG. 2 is a perspective view of a sugar-beet harvesting machine for several rows according to the invention, some parts being removed and others shown in section to show the various parts better.

The machine for harvesting several rows of sugar beets 4 according to the invention as shown in FIG. 2 is of the self-powered type and basically comprises a chassis 22 having two steerable front wheels 23 and two driven rear wheels 24. On the rear part of the chassis 22 relative to the normal direction of travel of the machine as shown by arrow f 1 there is mounted a receiving bin 25 adapted to receive the extracted sugar beets 4. Behind the bin 5 the chassis mounts; an engine 26 of the self-powered machine whereas in front of this bin the chassis mounts; the seat 27 for the operator of the machine. On the front part the chassis 22 carries an apparatus indicated generally at 28 and of the standard type for the topping of the sugar beets prior to their being extracted. Below the bin 25 and on the right side thereof in FIG. 2 there is a crop conveyor for moving, lifting and loading the extracted sugar beets into the bin 25, this conveyor being indicated generally at 29. Adjacent conveyor 29 is a plurality of identical grillwork wheels each indicated generally at 30, these wheels being carried on a chassis 31 of U-shape which is mounted for vertical oscillation at the ends of two arms of the U which are pivoted about horizontal pivots 32 assuring the connection with the chassis 22 of the machine.

At a predetermined distance from the horizontal pivots 32 are two lateral support wheels 34 carried by the arms of the U-shaped chassis 31 by means of vertical mounts 33. These mounts 33 are adjustable vertically as is the chassis 31. The vertical positioning of chassis 31 can be effected by means of a device functioning with a fluid that can be pressurized from a standard supply of the machine, comprising a hydraulic cylinder 35 carried by a support 36 fixed on the chassis 22. The piston rod 35a of the piston of this cylinder is articulated at its free end 37 on an end of a link 38 whose other end carries a horizontal pivot 39 slidable in a slot 40 formed in a second vertical link 41. This latter link is in turn pivoted at its lower end to the U-shaped chassis 31 by a horizontal pivot 42.

In the embodiment illustrated in FIG. 2 there are three identical grillwork wheels 30. Each of these wheels 30 is carried by a respective arm 43 forming an integral part of the chassis 31 with the axles of these wheels being inclined with respect to the vertical in partially superposed positions and next to each other aligned with a direction perpendicular to the intended direction of advance of the machine (arrow f 1).

In order to avoid confusion, the wheels 30 are shown schematically except for the wheel 30 to the extreme right as seen in FIG. 2. In fact each of the wheels 30 is consists of; a central disk hub 30 a surrounded by an external or peripheral grill 30b consisting of rods curved in a direction opposite the rotation sense of the wheel indicated by the arrow f 2 (see the right-hand wheel). At the center of the disk 30a there is an axle 44 rotatable in a sleeve 45 fixed on the support arm 43 and inclined with respect to the vertical. At the opposite free ends of this axle 44 which extends at one end above the sleeve 45 and at the other end below the central disk 30a there are mounted respective sprockets 46 and 47 for driving of the wheel 30 as will be described below. The shaft or axle 44 farthest to the right has no lower sprocket 47 and the shaft or axle 44 farthest to the left has no upper sprocket 46.

Above central disk 30a there is a plurality of arms 48 elastically biased pivoted and adapted to oscillate parallel to the central disk 30a about respective axes 49, each of these arms 48 being engaged by a spring 50 whose opposite ends are respectively hooked on the respective arm 48 and on the central disk 30a (see the wheel 30 to the right).

The crop conveyor 29 for lifting and loading is formed by five pairs of sprockets 51, 52, 53, 54, and 55 mounted on respective horizontal axles 56, 57, 58, 59, and 60 rotatable on supports forming part of the basic structure of the machine. On these pairs of sprockets 51, 52, 53, 54, and 55 there are mounted two endless chains 61 and 62 which are associated with respective tensioning wheels (not shown in FIG. 2) and along which there are fixed several grillwork entrainment arms indicated generally at 63, these arms being equidistant from each other. Below the chains 61 and 62 and laterally with respect to these latter there is a grillwork structure indicated generally at 64, this structure consisting of a floor 65 and lateral sides that serve to contain the extracted sugar beets as will be seen below, as they are moved laterally, be lifted and loaded into the receiving bin 25 along the inclined plane forming a slide 66.

The arms 67 fixed on the chassis 31 carry for each of the wheels 30 a pair of extractor plows 68 and 69, the extractor plow 68 being situated below and practically tangent and coplanar with the respective wheel 30. A grillwork guide 70 is fixed on the other extracting plow 69 and this grillwork guide forms a slide extending peripherally around the rear part of the periphery of the wheel 30 relative to the direction of travel of the machine, in fact from the extractor plow 69 toward the grillwork structure 64 constituting the base 65 and just up to a level slightly above this grillwork part 65, this floor 65 receiving the extracted sugar beets 4 intended to be lifted and loaded into the receiving bin 25. This grillwork structure 70 is connected at its upper part to a rod 71 forming part of an arm 71a fixed on the sleeve 45 carrying the wheel 30. There is also fixed to this sleeve 45 a fixed guide arm 72 for deflecting sugar beets 4 from the wheel 30 toward the horizontal section of the conveyor 29. This arm 72 is downstream of the extreme upper part of the grillwork structure forming the slide 70 with respect to the rotational sense of the wheel 30. The powering of the crop conveyor 29 and of the wheels 30 is effected from a drive shaft 73 of the machine by a means of a pair of bevel gears 74 and 75. A sprocket 76 is connected to the bevel gear 74 and through a chain 77 drives two sprockets 78 and 79 rotatable on an axle 80 carried horizontally by a mount forming part of the chassis 22 of the machine. The sprocket 79 through a chain 81 passing over a tensioning wheel 82 transmits motion to a sprocket 83 mounted on the axle 59 on which is mounted the pair of sprockets 54 which engage the chains 61 and 62 of the conveyor 29. The bevel gear 75 is also connected to a sprocket 84 which through a chain 85 passing over a tensioning wheel 86 transmits force to a sprocket 46 fixed on the axle 44 of the right-hand wheel 30. Also fixed on the axle 44 of this right-hand wheel 30 is another sprocket 87 which transmits motion through a chain 88 to the sprocket 47 fixed on the lower end of the axle 44 of the middle wheel 30. In the same manner the movement is transmitted from the middle wheel 30 to the left-hand wheel 30.

The lower part of the wall of the receiving bin 25 which is opposite the conveyor 29 is pivotal about a horizontal axis 89 so as to allow the unloading of the harvested sugar beets in the receiving bin 25 when the bin itself is rotated upwardly about a horizontal axis 90, and when the lower part of the above-mentioned wall is rotated about pivot 89 by two pairs of lateral cylinders operated by a fluid under pressure, these cylinders being respectively indicated at 91 and 92.

With the machine according to the present invention set up to harvest sugar beets 4 in several rows, these sugar beets are extracted by three pairs of extractor plows 68, 69 which lift them up from the three rows and which guide them until the sugar beets are carried by the respective grillwork wheels 30. From these three grillwork wheels 30 the sugar beets 4 which rest on these wheels are lifted with the help of the corresponding grillwork guide 70 forming a slide until they are discharged with the help of the fixed deflecting guide arm 72 onto the floor 65 of the crop conveyor 29 for lifting and loading through the wide completely empty region formed behind the three wheels 30. From this region the sugar beets are moved by the entrainment arms along the floor, and lifted upwardly and finally discharged into the receiving bin 25 along the inclined plane 66. In practice the machine for harvesting sugar beets in several rows according to the invention has shown itself to function in an extremely regular manner without jamming or stopping at all. This machine can easily be adapted to any type of conditions of ground level with simple structural arrangements which relate to the various parts. Thus, for example, it is possible to provide the arms 43 supporting the wheels 30 and associated with the chassis 31 so that they can oscillate independently of each other with respect to the chassis 31 and to provide means, for example, of the type comprising a cylinder operated by a fluid under pressure to decide the amplitude of oscillation of the arms 43 and to drive the wheels 30 with separate motors.

I claim:

1. A machine for harvesting sugar beets growing in at least two longitudinally extending and generally parallel rows, said machine comprising:
   a chassis displaceable along the ground longitudinally of said rows and carrying a receptacle for receiving sugar beets;
   at least two pairs of extractor plows transversely spaced from each other on said chassis at a transverse spacing corresponding generally to that of said rows and engageable in the ground under said chassis;
   means on said chassis for displacing same along the ground and thereby digging up the sugar beets in said rows with said plows;
   at least two respective grillwork wheels rotatable on said chassis about respective nonvertical axes adjacent said pairs of plows and each generally tangent to one of the plows of the respective pair, each of said wheels being vertically superposed with the adjacent wheel and lying in a respective longitudinally extending plane inclined to the vertical;
   a conveyor on said chassis having a horizontal stretch having a forwardly open transversely elongated inlet mouth behind said wheels and a lateral outlet, and a vertical stretch having a lower inlet at said lateral outlet and an upper outlet opening into said receptacle;
   at least two respective guides on said chassis and extending from said wheels to said inlet mouth;
   means on said chassis for rotating said wheels about the respective axes and thereby displacing sugar beets dug up by the respective plows back along said guides into the inlet mouth of said horizontal stretch; and
   means on said chassis for operating said conveyor for conveying sugar beets displaced into said inlet mouth by said wheels first transversely and then vertically into said receptacle.

2. The machine defined in claim 1 wherein said means for rotating said wheels includes a sprocket on each of said wheels and chains extending between said sprockets.

3. The machine defined in claim 1 wherein each of said wheels includes a plurality of generally radially extending and deflectable arms generally above the respective wheel and rotatable therewith, said arms being engageable with the beets dug up by the respective plows and displaced backwardly by the respective wheel.

4. The machine defined in claim 1 wherein said chassis includes a subchassis pivotal on said chassis about a horizontal and transverse axis, said wheels being mounted on said subchassis.

5. The machine defined in claim 1 wherein said conveyor has respective horizontal and vertical grillwork guides surrounding said horizontal and vertical stretches.

6. The machine defined in claim 1 wherein each of said wheels has a multiplicity of arms extending generally radially and inclined away from the rotation direction of the respective wheel.

7. The machine defined in claim 1, further comprising means for positioning said plows and wheels at a predetermined vertical spacing from said chassis.

8. The machine defined in claim 1, further comprising means on said chassis ahead of said plows for topping the sugar beets in said rows.

* * * * *